US008863105B2

(12) United States Patent  (10) Patent No.: US 8,863,105 B2
Jie et al.  (45) Date of Patent: Oct. 14, 2014

(54) AUTOMATIC CONTROL SYSTEM AND METHOD FOR EXECUTING CONTROL PROGRAM IN PARALLEL

(75) Inventors: Ming Jie, Beijing (CN); Fei Long, Beijing (CN); Li Pan, Beijing (CN); Detlef Pauly, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 567 days.

(21) Appl. No.: 13/131,002

(22) PCT Filed: Nov. 28, 2008

(86) PCT No.: PCT/CN2008/073239
§ 371 (c)(1),
(2), (4) Date: May 24, 2011

(87) PCT Pub. No.: WO2010/060243
PCT Pub. Date: Jun. 3, 2010

(65) Prior Publication Data
US 2011/0230978 A1  Sep. 22, 2011

(51) Int. Cl.
*G06F 9/45* (2006.01)
(52) U.S. Cl.
CPC . *G06F 8/456* (2013.01); *G06F 8/45* (2013.01)
USPC .......................................... 717/149; 717/144
(58) Field of Classification Search
CPC .................... G06F 8/45; G06F 8/456
USPC ........................................ 717/144, 149, 156
See application file for complete search history.

(56) References Cited

U.S. PATENT DOCUMENTS

| 4,872,158 | A | * | 10/1989 | Richards | ................. | 370/380 |
|---|---|---|---|---|---|---|
| 5,157,785 | A | | 10/1992 | Jackson et al. | | |
| 5,214,747 | A | | 5/1993 | Cok | | |
| 5,761,523 | A | | 6/1998 | Wilkinson et al. | | |
| 5,896,289 | A | * | 4/1999 | Struger | ................. | 700/9 |

(Continued)

FOREIGN PATENT DOCUMENTS

| CN | 1906579 A | 1/2007 |
|---|---|---|
| CN | 101019084 | 8/2007 |

(Continued)

*Primary Examiner* — Phillip H Nguyen
(74) *Attorney, Agent, or Firm* — Cozen O'Connor (57) ABSTRACT

An automatic control system capable of executing a control program in parallel is described. The system includes more than one unit controller, each executing in parallel at least a part of the program to be executed by the automatic control system; a compiler, connected to one of the unit controllers, for converting the program to be executed by the automatic control system into tasks executed in parallel by the unit controllers; an interconnection network, for connecting the unit controllers, such that information on one of the unit controllers is transferred to another one via the interconnection network.

12 Claims, 7 Drawing Sheets

(56) References Cited

U.S. PATENT DOCUMENTS

| | | | |
|---|---|---|---|
| 5,928,351 A * | 7/1999 | Horie et al. | 712/11 |
| 6,367,070 B1 * | 4/2002 | Haghighat et al. | 717/160 |
| 6,374,403 B1 * | 4/2002 | Darte et al. | 717/161 |
| 6,438,747 B1 * | 8/2002 | Schreiber et al. | 717/160 |
| 6,550,000 B1 * | 4/2003 | Minematsu et al. | 712/215 |
| 7,926,046 B2 * | 4/2011 | Halambi et al. | 717/151 |
| 8,544,006 B2 * | 9/2013 | Bell et al. | 718/100 |
| 2003/0041315 A1 | 2/2003 | Bates et al. | |
| 2005/0108696 A1 * | 5/2005 | Dai et al. | 717/151 |
| 2006/0031652 A1 * | 2/2006 | Richter et al. | 711/165 |
| 2007/0110081 A1 | 5/2007 | Miller | |
| 2007/0204082 A1 | 8/2007 | Shimizu | |
| 2007/0255929 A1 | 11/2007 | Kasahara et al. | |
| 2007/0279449 A1 | 12/2007 | Mori et al. | |
| 2009/0164752 A1 | 6/2009 | McConnell | |

FOREIGN PATENT DOCUMENTS

| | | |
|---|---|---|
| CN | 101094238 A | 12/2007 |
| EP | 1 864 813 | 12/2007 |
| GB | 2417105 A | 2/2006 |
| JP | 2002152219 | 5/2002 |
| WO | WO 9119269 A1 | 12/1991 |
| WO | WO2009012683 A1 | 2/2009 |

* cited by examiner

AUTOMATIC CONTROL SYSTEM AND METHOD FOR EXECUTING CONTROL PROGRAM IN PARALLEL

CROSS-REFERENCE TO RELATED APPLICATIONS

This is a U.S. national stage of International Application No. PCT/CN2008/073239, filed on 28 Nov. 2008.

BACKGROUND OF THE INVENTION

1. Field of the Invention

The present invention relates to an automatic control system and, more particularly, to an automatic control system configured to execute a control program in parallel and a method for executing the control program in parallel on the automatic control system.

2. Description of the Related Art

Generally, an automatic control system is used for processing a certain range of automation tasks. When the tasks processed by the automatic control system exceed the capacity and processing power of the system, the system needs to be updated, i.e., the capacity, processing power, and performance of the system are upgraded to satisfy the requirements of the automatic control system.

In conventional methods for updating the automatic control system, the original system is replaced by a higher-level system with larger capability and stronger processing power so as to meet the requirements of system updating. However, such a replacement-type updating leads to high cost and complicated operation. For example, the upgrade of a programmable logic control (PLC) system includes the following steps. Initially, engineers evaluate the requirements of the automatic control system to be upgraded, and select and purchase a higher-level PLC system to replace the original PLC system. Then, the original PLC system is replaced and the new higher-level PLC system is installed. It is also necessary to check wirings of field devices, such as sensors, actuators, panels, and human machine interfaces, of the upgraded PLC system at installation. New panels or human machine interfaces are configured on the upgraded PLC system. Furthermore, the engineers have to reprogram the upgraded PLC system that probably uses a different programming environment. Finally, the engineers adjust hardware and software of the new PLC system and place the updated PLC system into operation.

It will be appreciated that, the above-described upgrading process leads to high cost and capacity wastes caused by overcapacity products purchased due to difficulty of getting products that have the suitable capacity. Moreover, the re-installation, re-configuration, re-programming, and re-adjustment of the upgraded PLC system also result in wastes in cost and manpower.

SUMMARY OF THE INVENTION

It is therefore an object of the present invention to provide an automatic control system that can be easily upgraded and replaced and a method for executing control tasks on the automatic control system.

These and other objects and advantage may be achieved in accordance with the invention by providing an automatic control system that is configured to execute a control program in parallel. The system includes a plurality of unit controllers, a compiler, and an interconnection network. Each of the plurality of unit controllers executes in parallel at least a part of the program to be executed by the automatic control system. The compiler is connected to one of the unit controllers for converting the program to be executed by the automatic control system into a task executed in parallel on the plurality of unit controllers. The interconnection network is used for connecting the unit plurality of controllers, such that information on one of the unit controllers is transferred to another unit control of the plurality of unit controllers over the interconnection network.

In an embodiment of the present invention, the unit controller has two internal interfaces and a switch. The two internal interfaces are respectively connected to two adjacent unit controllers of the unit controller and both connected to the switch. The switch is connected to a data bus and an address bus of the unit controller.

In another embodiment of the present invention, the internal interfaces are Ethernet interfaces. In yet another embodiment, the unit controller transfers information to another of the plurality of unit controllers in a message transfer manner.

In a further embodiment, the unit controller also includes a CPU for executing a control program in parallel, a system memory for storing system programs and data, a user memory for storing user programs and data, an input circuit, an output circuit, and an expansion connecting component for expanding input/output.

It is also an object to provide a method for executing a control program in parallel in a system including a plurality of controllers, a compiler and an interconnection network. The method includes the steps of (1) slicing the program to be executed by the automatic control system, (2) building a control flow graph (CFG) for each slice based on semantic analysis, (3) building a control dependence graph (CDG), a data dependence graph (DDG), and a hardware dependence graph (HDG), respectively, based on the CFG, and (4) extracting a parallelism of the slices from the CDG, the DDG and the HDG.

In accordance with an embodiment of the invention, in Step (1), the program to be executed by the automatic control system is sliced according to networks with label (NWL).

In accordance with another embodiment of the invention, in Step (2), the CFG is a directed graph CFG=(V, E) with a unique starting point and a unique end point, where V is a set of nodes of the NWL, E is a set of edges formed by any two nodes x, y in the set of nodes V and denoted by E={(x,y)|x, y∈V}.

In another embodiment, in Step (3), the CDG CDG=(CV, CE) is a directed labeled graph CDG=(CV, CE), where CV=V, i.e., CV is a set of nodes of the NWL, CE is a set of edges formed by any two nodes x,y in the set of nodes CV and denoted by (x,y)∈CE. If a dependency between x and y exists, i.e., $y\Delta_p x$ exists and the node x reaches the node y through a node a, a label of the edges formed by the nodes x and y is labeled as x-a. In other words, the existence of the edge from x to y is denoted by $y\Delta_p x$ and an attribute, i.e., a weight or value, of the edge from x to y is denoted by x-a.

In yet another embodiment, in Step (3), the DDG is a directed labeled graph DDG=(DV, DE), where DV=V, i.e., DV is a set of nodes of the NWL, DE is a set of edges formed by any two nodes x,y in the set of nodes DV and denoted by (x, y)∈DE. The edges (x,y) are labeled as $x\delta_d y$ by a label.

In another embodiment, in Step (3), the HDG is a directed labeled graph HDG=(HV, HE), where HV=V, i.e., HV is a set of nodes of the NWL, HE is a set of edges formed by any two nodes x,y in the set of nodes HV and denoted by (x,y)∈HE. The edges (x,y) are labeled as $x\delta_h y$ by a label.

With the automatic control system for parallel execution in accordance with the disclosed embodiment, the original old system is upgraded or updated in an expansion manner. Compared with the conventional replacement-type upgrading manner, on the one hand, the upgrade can be performed more quickly and easily, and on the other hand, the expense is reduced and the cost of upgrading the system is lowered because only new modules or devices need to be added to the original system.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE PREFERRED EMBODIMENTS

The conventional method for upgrading an automatic control system is to replace the old automatic control system completely with a new one by a replacement-type method, while the present invention adopts a totally different upgrading method from the conventional one, i.e., adopts an expansion-type upgrading structure and method. The present invention adopts the expansion-type upgrading structure based on the execution of a control program in parallel, i.e., executing multiple program instructions and data concurrently on multiple processors in order to obtain an operation result more quickly.

Figure 1:
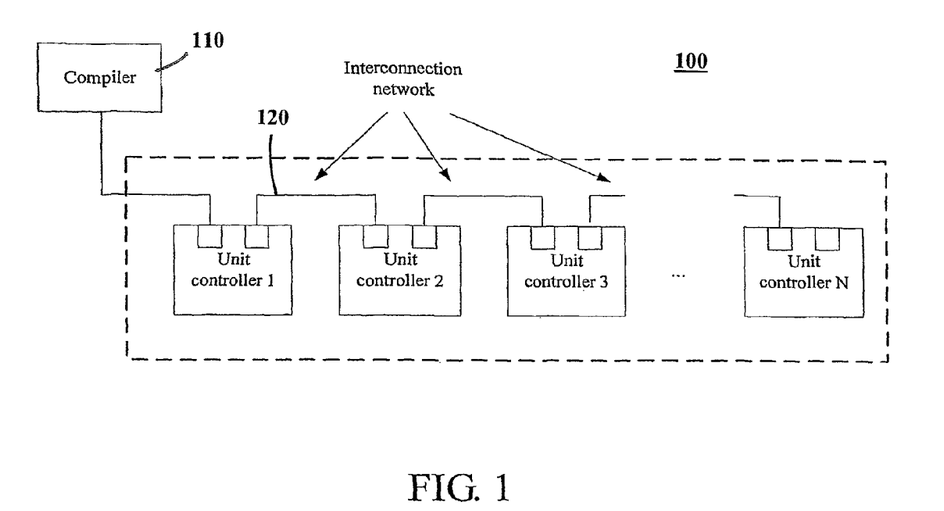
FIG. 1 is a schematic block diagram of an automatic control system in accordance with the invention.

FIG. 1 is a schematic block diagram of an automatic control system in accordance with the invention. The automatic control system 100 for executing parallel tasks in FIG. 1 includes N unit controllers from a unit controller 1 to a unit controller N, a compiler 110, and an interconnection network 120. The N unit controllers are used for executing in parallel a program to be executed by the automatic control system, that is, each of the unit controllers executes a part of the program to be executed by the automatic control system 100. The compiler 110 is connected to one of the N unit controllers, usually the unit controller 1. The compiler 110 converts a serial program described in an engineering language into codes capable of being executed on the N unit controllers, and converts the serial control program into parallel control programs, so as to ensure that the unit controller 1 can execute parallel tasks. The N unit controllers are connected by the interconnection network 120, such that information on one unit controller of the N unit controllers can be transferred to another unit controller over the interconnection network 120.

Each of the N unit controllers has two internal interfaces and a switch. The two internal interfaces on a unit controller are Ethernet interfaces, and are respectively connected to two adjacent unit controllers before and after the unit controller to form a "daisy chain" connection. Here, the daisy chain comprises a concatenation of the N unit controllers by the interconnection network 120 such that information is transferred from one unit controller to the next unit controller. The two internal interfaces on each of the unit controllers are both connected to the switch of the unit controller. The switch is located inside the unit controller, and is connected to a data bus and an address bus of the unit controller. After the N unit controllers are connected by the interconnection network 120 into the daisy chain, information is transferred from one unit controller to another unit controller in a message transfer manner.

Figure 2:
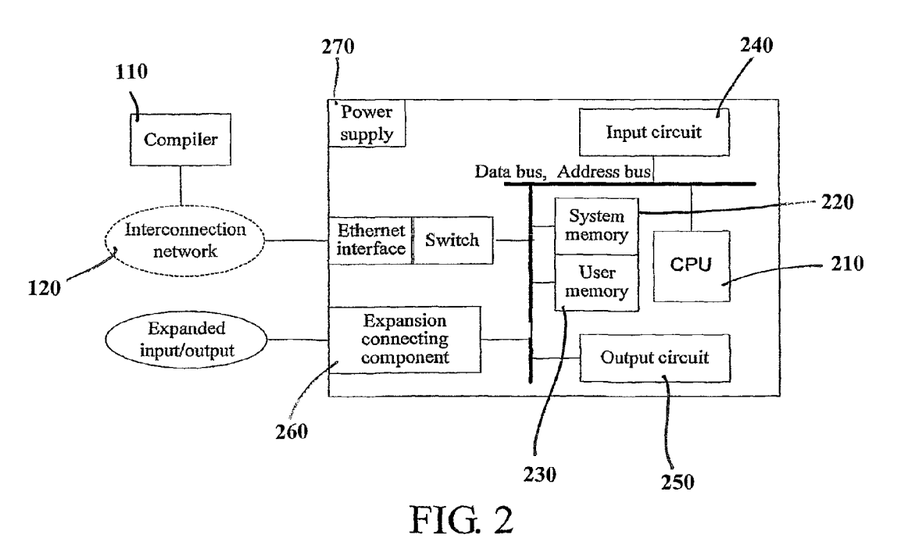
FIG. 2 is a schematic block diagram of a unit controller in the automatic control system of FIG. 1 in accordance with the invention.

FIG. 2 is a schematic block diagram of a unit controller in the automatic control system 100 in accordance with the invention. Each of the N unit controllers further includes a CPU 210 for executing a control program in parallel, a system memory 220 for storing system programs and data, a user memory 230 for storing user programs and data, an input circuit 240, an output circuit 250, an expansion connecting component 260 for expanding input/output, and a power supply 270. The CPU 210 is the minimum unit on the unit controller for executing the control program in parallel, and executes control tasks assigned by the compiler 110. The system memory 220 stores programs and data that are usually not changed, such as an operating system of the unit controller. The system memory 220 may be set as read-only. The user memory 230 stores user programs and data that may be read or modified. When a new segment of user program and data is loaded into the user memory 230, the old user program and data stored in the user memory 230 is overwritten or deleted. The input circuit 240 is used for providing inputs to the unit controller, and the output circuit 250 is used for providing outputs to the unit controller. The expansion connecting component 260 is used for connecting expansion modules external to the unit controller, such as expanded input/output circuits. The CPU 210, the system memory 220, the user memory 230, the input circuit 240, the output circuit 250, and the expansion connecting component 260 are respectively connected to the data bus and respectively connected to the address bus.

Figure 3:
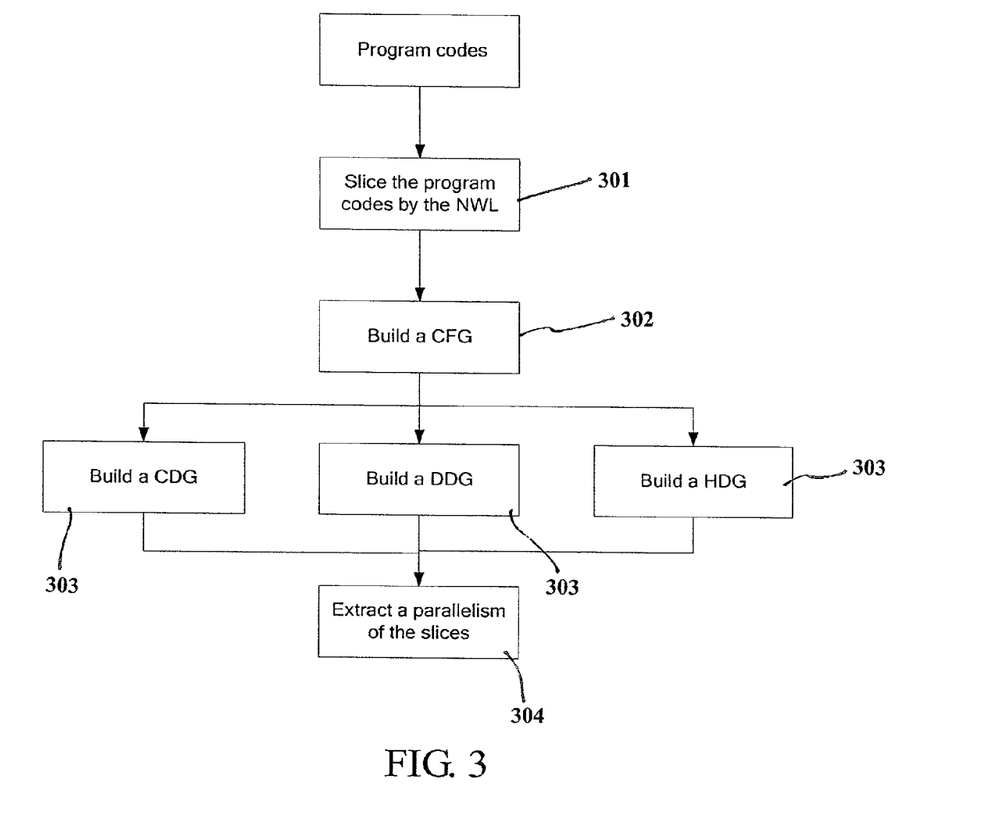
FIG. 3 is a flow chart of a method for executing a control program in parallel in the automatic control system of FIG. 1 in accordance with an embodiment of the invention.

FIG. 3 is a flow chart of a method for executing a control program in parallel in the automatic control system of the present invention. The method comprises slicing the program to be executed by the automatic control system, as indicated in step 301. Here, the program to be executed by the automatic control system is initially sliced into some individual parts. Normally, three granularity levels may be used to slice the program: an instruction level, a function level, and a task level. In the Programming Languages of Industrial Control Standard IEC 61131-3 formulated by the International Electrotechnical Commission (IEC), control programs written in engineering languages (such as a ladder diagram (LD) and a function block diagram (FBD)) consist of a number of networks with label (NWL). Consequently, the control programs are naturally sliced by the NWL. Compared with slicing using the instruction level, slicing programs by the NWL can reduce the slicing complexity. Compared with slicing using the task level, slicing programs by the NWL is easier to achieve load balance when one or more tasks exist. A control flow graph (CFG) is built for each slice based on semantic analysis, as indicated in step 302. The CFG is built based on the NWL. The CFG is a directed graph CFG=(V,E) with a unique starting point START and a unique end point STOP, where V is a set of nodes of the NWL, E is a set of edges formed by any two nodes x,y in the set of nodes V in accordance with the relationship:

$$E=\{(x,y)|x,y \in V\}.$$

A control dependence graph (CDG), a data dependence graph (DDG), and a hardware dependence graph (HDG) are respectively built based on the CFG, as indicated in step 303. In order to construct the CDG from the CFG a post-dominator tree (PDT) is introduced, which may determine whether a dependency in control flow exists between two nodes. The PDT is a tree structure rooted at the end point. If x is an immediate post-dominator of y, then y is a direct descendant of x. Here, y is regarded as the post-dominator of x if and only if every path from the node x to the end point STOP (not including x) contains the node y. Then, the relationship between x and y may be denoted by $y\Delta_p x$. The immediate post-dominator is the least element in the chain of post-dominators of the node x.

The CDG of the CFG CFG=(V, E) is a directed labeled graph CDG=(CV, CE), where CV=V, i.e., CV is a set of nodes of the NWL, CE is a set of edges formed by any two nodes x,y in the set of nodes CV and denoted by $(x,y) \in CE$. If a dependency between x and y exists, i.e., $y\Delta_p x$ exists and the node x reaches the node y through a node a, a label of the edges formed by the nodes x and y is labeled as x-a. In other words, the existence of the edge from x to y is denoted by $y\Delta_p x$ and an attribute (or referred to as a weight or value) of the edge from x to y is denoted by x-a.

Furthermore, if the node x is not an immediate post-dominator of the node y, then a non-null path P=(x, a, ..., y) exists from the node x to the node y and $y\Delta_p z$ holds for any node $z \in P$ (excluding the nodes x and y) on the non-null path (i.e., the node z is the post-dominator of the node y), a dependency between y and x exists and is denoted by $x\delta_c y$.

The DDG of the CFG CFG=(V,E) is a directed labeled graph DDG=(DV, DE), where DV=V, i.e., DV is a set of nodes of the NWL, DE is a set of edges formed by any two nodes x,y in the set of nodes DV and denoted by $(x,y) \in DE$. The edges DE are labeled as $x\delta_d y$ by a label. If a data conflict exists between x,y (i.e., the same variable is accessed), a data dependency exists between x,y, which is denoted by $x\delta_d y$.

The HDG of the CFG CFG=(V, E) is a directed labeled graph HDG=(HV, HE), where HV=V, i.e., HV is a set of nodes of the NWL, HE is a set of edges formed by any two nodes x,y in the set of nodes HV and denoted by $(x,y) \in HE$. The edges HE are labeled as $x\delta_h y$ by a label. If a hardware conflict exists between x,y (i.e., the hardware resource on the same unit controller is accessed), a hardware dependency exists between x,y, which is denoted by $x\delta_h y$.

A parallelism of the slices is extracted from the CDG, the DDG, and the HDG nodes not mutually dependent are found according to the CDG, the DDG, and the HDG, as indicated in step 304. Here, the located nodes may be executed on different unit controllers, while nodes dependent on each other must be executed on the same unit controller in a sequence of the nodes. Multiple unit controllers are used for concurrent execution. Accordingly, the time for executing the automatic control program is shortened.

Figure 4:
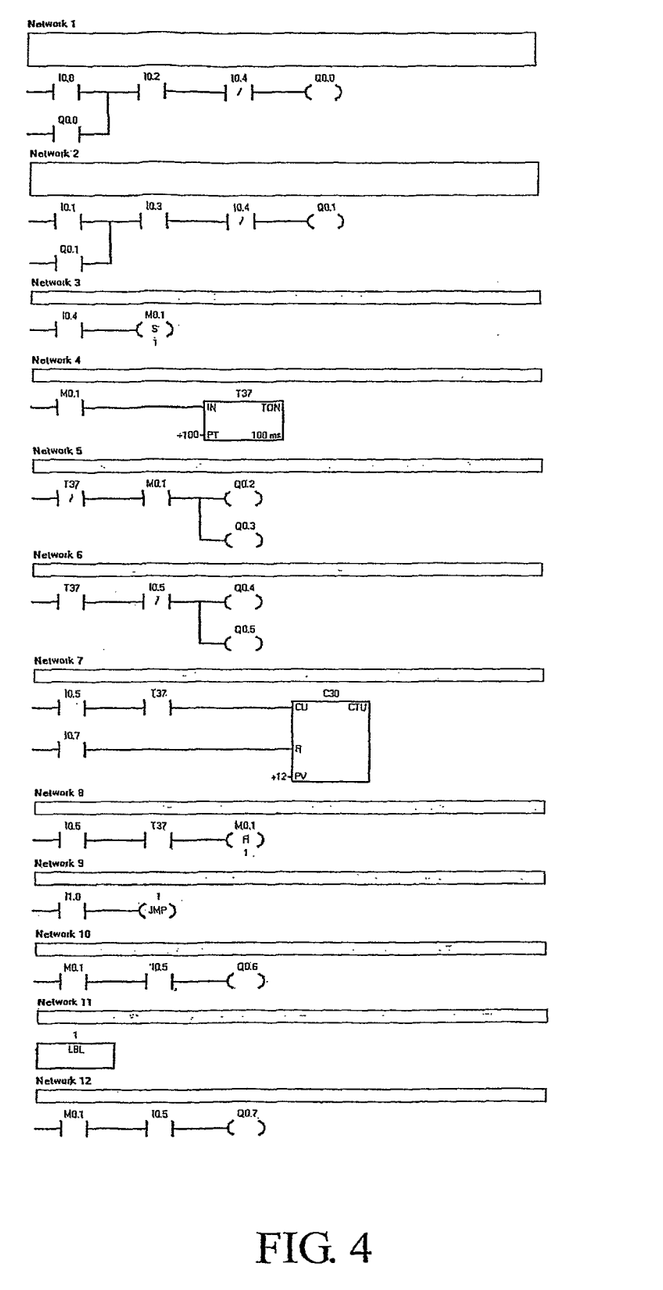
FIG. 4 shows a segment of a control program described in an engineering language, and a dependence model built in accordance with the method of the invention for executing a control program of FIG. 3 in parallel based on code segments.
Figure 5:
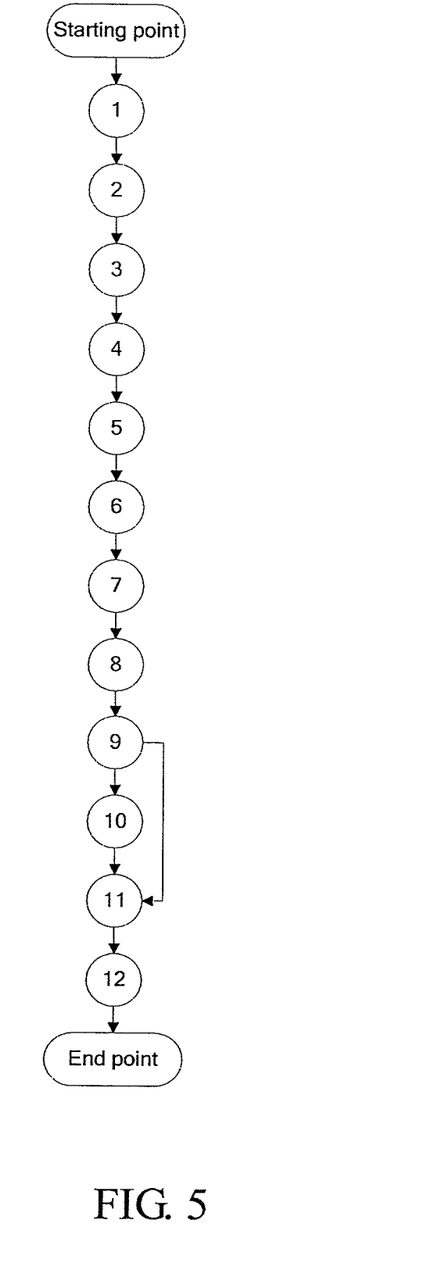
FIG. 5 is a control flow graph (CFG) built for the control program shown in FIG. 4.
Figure 6:
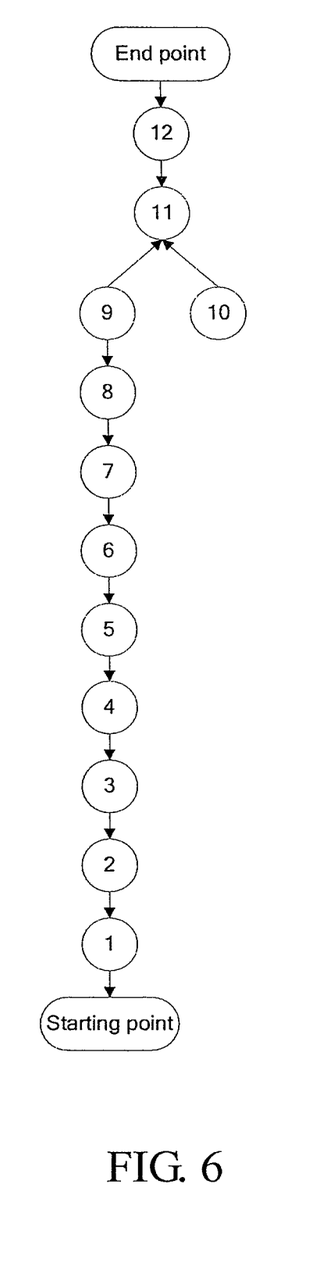
FIG. 6 is a post-dominator tree (PDT) built for the control program shown in FIG. 4.

FIG. 4 shows a segment of a control program described in an engineering language, and a dependence model is built in accordance with the method for executing a control program in parallel based on the segment of codes. In general, the nodes in the above-described CFG and various dependence graphs may be program units, for example, a node is viewed as a function, and the edges in the CFG and various dependence graphs indicate dependencies. A total of 12 NWL, i.e., 12 nodes exist in this segment of control program. In turn, CFG (see FIG. 5), a PDT (see FIG. 6), a CDG (see Table 1), a DDG (see Table 2), and an HDG (see Table 3) are built for the 12 nodes.

TABLE 1

CDG of 12 nodes shown in FIG. 4

| 1 | 2 | 3 | 4 | 5 | 6 | 7 | 8 | 9 | 10 | 11 | 12 |
|---|---|---|---|---|---|---|---|---|----|----|----|
| 10 |  |  |  |  |  |  |  | 1 |  |  |  |

TABLE 2

DDG of 12 nodes shown in FIG. 4

| | 1 | 2 | 3 | 4 | 5 | 6 | 7 | 8 | 9 | 10 | 11 | 12 |
|---|---|---|---|---|---|---|---|---|---|----|----|----|
| 1 | | | | | | | | | | | | |
| 2 | | | | | | | | | | | | |
| 3 | | | | M0.1 | M0.1 | | | M0.1 | | M1.0 | | M0.1 |
| 4 | | | | | M0.1 | | | M0.1 | | M1.0 | | M1.0 |
| 5 | | | | | | | | M0.1 | | M1.0 | | M1.0 |
| 6 | | | | | | | | | | | | M1.0 |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |

TABLE 3

HDG of 12 nodes shown in FIG. 4

| | 1 | 2 | 3 | 4 | 5 | 6 | 7 | 8 | 9 | 10 | 11 | 12 |
|---|---|---|---|---|---|---|---|---|---|----|----|----|
| 1 | | I0.4 | I0.4 | | | | | | | | | |
| 2 | | | I0.4 | | | | | | I0.1 | | | |
| 3 | | | | | | | | | | | | |

TABLE 3-continued

HDG of 12 nodes shown in FIG. 4

| | 1 | 2 | 3 | 4 | 5 | 6 | 7 | 8 | 9 | 10 | 11 | 12 |
|---|---|---|---|---|---|---|---|---|---|---|---|---|
| 4 | | | | | T37 | T37 | T37 | T37 | | | | |
| 5 | | | | | | T37 | T37 | T37 | | | | |
| 6 | | | | | | | I0.5, T37 | I0.5, T37 | | I0.5 | | I0.5 |
| 7 | | | | | | | | I0.5, T37 | | I0.5 | | I0.5 |
| 8 | | | | | | | | | | I0.5 | | I0.5 |
| 9 | | | | | | | | | | | | |
| 10 | | | | | | | | | | | | I0.5 |
| 11 | | | | | | | | | | | | |
| 12 | | | | | | | | | | | | |

Figure 7A:
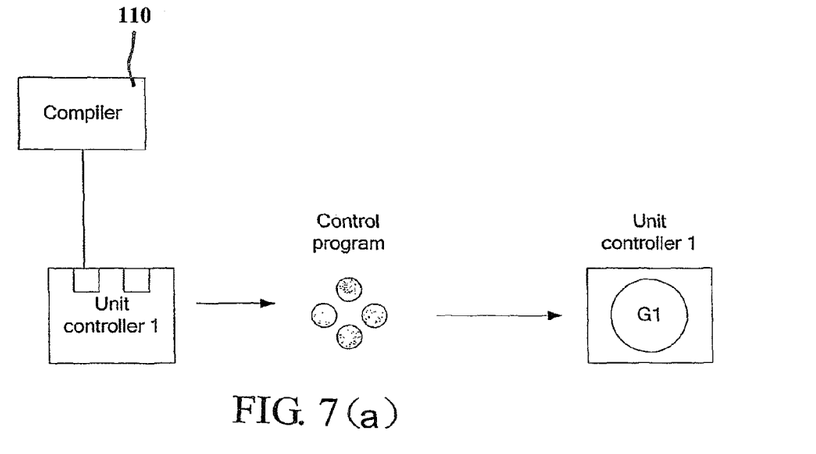
FIGS. 7(a) and 7(b) are schematic block diagrams illustrating a comparison of the automatic control system before upgrade and after upgrade in accordance with the invention, respectively.
Figure 7B:
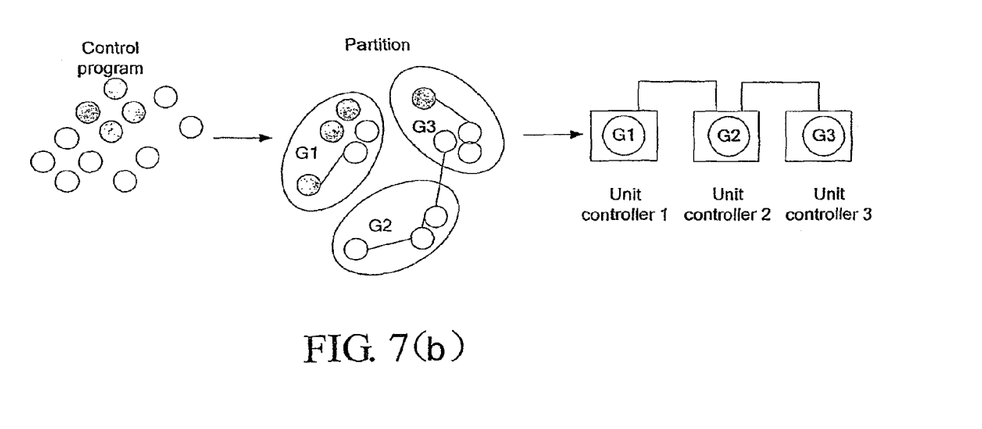

FIGS. 7(a) and 7(b) are schematic block diagrams illustrating a comparison of the automatic control system before upgrade and after upgrade respectively in accordance with the invention. In FIG. 7a, before the system is upgraded, the automatic control system only has one unit controller on which a group of control program G1 runs. If the original system before upgrade cannot meet the requirements of newly added applications for processing power and memory space, the original system is upgraded in accordance with the method of the invention, as shown in FIG. 7b. After the upgrade, 2 unit controllers are added to the automatic control system 100. The 3 unit controllers are connected to one another by the interconnection network 120. The control program running in the automatic control system 100 is partitioned into 3 groups (respectively G1, G2, and G3) based on the analysis of the CDG, DDG, and HDG using the method in accordance with the invention. The three groups of control program are run on the three unit controllers, respectively.

Figure 8:
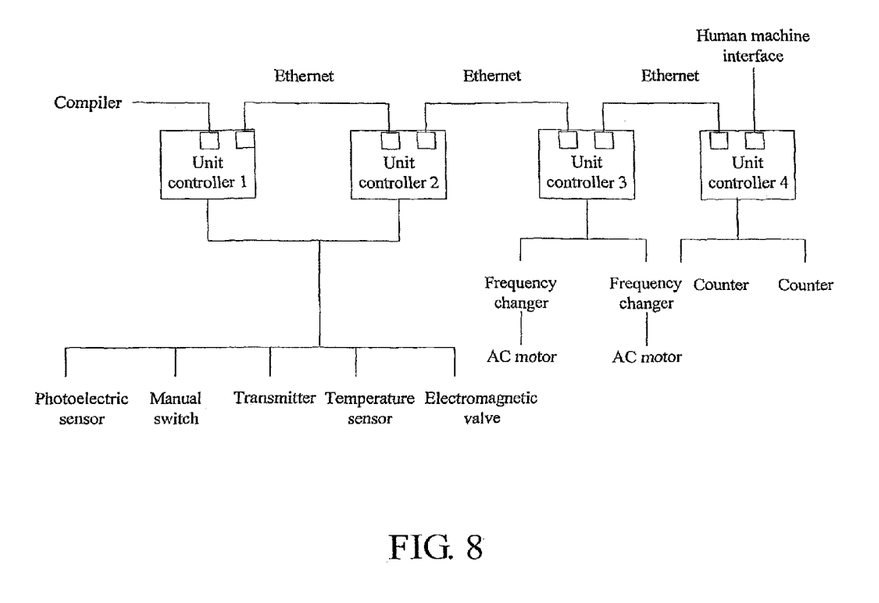
FIG. 8 is a schematic block diagram of an application in accordance with the invention in an industrial control system.

FIG. 8 is a schematic block diagram of an application of the invention in an industrial control system. In FIG. 8, the automatic control system 100 in accordance with the invention receives a signal of a sensor or transmitter, runs a control program on each unit controller, and sends a control signal to an executive mechanism. A human machine interface (HMI)/panel and a compiler are respectively connected to the automatic control system over the interconnection network 120.

As evident from the above-described embodiments, in the automatic control system 100 and method for parallel execution in accordance with the invention, the original old system is upgraded or updated in an expansion manner. Therefore, the automatic control system 100 may be upgraded quickly and conveniently, and the cost of upgrading the automatic control system is reduced.

The above merely describes preferred embodiments of the present invention, but not intends to limit the present invention. Any modifications, equivalent substitutions, and variations made within the spirit and scope of the present invention fall within the scope of the present invention.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. An automatic control system for executing parts of a control program in parallel, comprising:
    a plurality of unit controllers each having a respective CPU for executing the parts of the control program in parallel, each of the plurality of unit controllers being configured to execute in parallel at least a separate and related part of the parts of the control program to be executed by the automatic control system;
    a compiler configured to convert a serial program described in an engineering language into codes for execution on the plurality of unit controllers and to convert the serial control program into the control program, the compiler being connected to a first unit controller of the plurality of unit controllers, the compiler being further configured to convert the control program to be executed by the automatic control system into the separate and related parts of the control program and comprising related tasks executed in parallel on each of the plurality of unit controllers; and
    an interconnection network interconnecting the plurality of unit controllers such that information on the first unit controller is transferred to another of the unit controllers over the interconnection network.

2. The system as claimed in claim 1, wherein each of the unit controllers includes two internal interfaces and a switch, each of the two internal interfaces being respectively connectable to two unit controllers adjacent to each of the unit controllers and connected to the switch which is being connected to a data bus and an address bus of each of the unit controllers.

3. The system as claimed in claim 2, wherein the internal interfaces are Ethernet interfaces.

4. The system as claimed in claim 1, wherein each of the unit controllers transfers information to another of the plurality of unit controllers in a message transfer manner.

5. The system as claimed in claim 2, wherein each of the unit controllers further includes a system memory for storing system programs and data, a user memory for storing user programs and data, an input circuit, an output circuit, and an expansion connecting component configured to expand input/output.

6. The system as claimed in claim 3, wherein each of the unit controllers further includes a system memory for storing system programs and data, a user memory for storing user programs and data, an input circuit, an output circuit, and an expansion connecting component configured to expand input/output.

7. A method for executing parts of a control program to be executed in parallel by an automatic control system having a plurality of unit controllers each having a respective CPU for executing the parts of the control program in parallel, a compiler and an interconnection network interconnecting the plurality of unit controllers, the method comprising:
- converting, by the compiler, a serial program described in an engineering language into codes for execution on the plurality of unit controllers and converting, by the compiler, the serial control program into the control program;
- slicing the control program into separate and related parts to be executed in parallel by the automatic control system having the plurality of unit controllers each having the respective CPU for executing the parts of the control program in parallel;
- building a control flow graph (CFG) for each slice of the separate and related parts of the control program based on semantic analysis;
- building a control dependence graph (CDG), a data dependence graph (DDG) and a hardware dependence graph (HDG), respectively, based on the CFG; and
- extracting a parallelism of each slice of the separate and related parts of the control program from the CDG, the DDG and the HDG.

8. The method as claimed in claim 7, wherein said step of slicing the control program into the separate and related parts comprises slicing the control program according to networks with label (NWL).

9. The method as claimed in claim 8, wherein said CFG is a directed graph CFG=(V,E) having a unique starting point and a unique end point, where V is a set of nodes of the NWL, E is a set of edges formed by any two nodes x, y in the set of nodes V in accordance with the relationship:

$$E=\{(x,y)|x,y \in V\}.$$

10. The method as claimed in claim 8, wherein the CDG is a directed labeled graph CDG=(CV, CE), wherein CV=V, and wherein CV is a set of nodes of the NWL, CE is a set of edges formed by any two nodes x, y in the set of nodes CV and denoted by $(x,y) \in CE$, and the edges (x,y) are labeled as $x\delta_c y$ by a label.

11. The method as claimed in claim 8, wherein the DDG is a directed labeled graph DDG=(DV, DE), wherein DV=V, and wherein DV is a set of nodes of the NWL, DE is a set of edges formed by any two nodes x, y in the set of nodes DV and denoted by $(x, y) \in DE$, and the edges (x,y) are labeled as $x\delta_d y$ by a label.

12. The method as claimed in claim 8, wherein HDG is a directed labeled graph HDG=(HV, HE), wherein HV=V, and wherein HV is a set of nodes of the NWL, HE is a set of edges formed by any two nodes x, y in the set of nodes HV and denoted by $(x,y) \in HE$, and the edges (x,y) are labeled as $x\delta_h y$ by a label.

* * * * *